United States Patent [19]

Murray et al.

[11] Patent Number: 4,727,795
[45] Date of Patent: Mar. 1, 1988

[54] PISTONS

[75] Inventors: Edward J. Murray, Ilkley; Frederick H. Thompson, Bradford, both of England

[73] Assignee: AE PLC, Warwickshire, England

[21] Appl. No.: 666,225

[22] Filed: Oct. 29, 1984

[30] Foreign Application Priority Data

Oct. 29, 1983 [GB] United Kingdom ............... 8328931

[51] Int. Cl.$^4$ .................................................. F16J 1/00
[52] U.S. Cl. ........................................ 92/189; 92/212; 92/216; 92/220; 92/224; 123/193 P
[58] Field of Search ................ 92/216, 217, 218, 219, 92/220, 221, 222, 224, 238, 189, 212; 123/193 P

[56] References Cited

U.S. PATENT DOCUMENTS

| 1,017,498 | 2/1912 | Bittner | 92/217 X |
| 1,249,799 | 12/1917 | Maire | 92/221 |
| 1,394,898 | 10/1921 | Harriman | 92/217 X |
| 1,507,490 | 9/1924 | Kuchemann et al. | |
| 1,542,209 | 6/1925 | Bergeron | 92/189 X |
| 1,561,030 | 11/1925 | Short | 92/188 X |
| 2,198,689 | 4/1940 | Wills | |
| 2,323,310 | 7/1943 | Clark | 123/193 P X |
| 2,372,993 | 4/1945 | Weir | |
| 3,877,351 | 4/1975 | Barfiss | 92/216 X |
| 4,072,088 | 2/1978 | Goloff | 92/220 |
| 4,375,782 | 3/1983 | Schieber | 92/220 X |
| 4,433,616 | 2/1984 | Hauser | 92/220 X |
| 4,440,069 | 4/1984 | Holtzberg et al. | 123/193 P X |

FOREIGN PATENT DOCUMENTS

| 708646 | 7/1941 | Fed. Rep. of Germany . | |
| 870737 | 3/1942 | France . | |
| 2238372 | 2/1975 | France . | |
| 72654 | 4/1983 | Japan | 123/193 P |
| 115576 | 5/1918 | United Kingdom . | |
| 221435 | 9/1924 | United Kingdom . | |
| 291294 | 5/1928 | United Kingdom . | |
| 357197 | 9/1931 | United Kingdom . | |
| 389649 | 3/1933 | United Kingdom . | |
| 389387 | 3/1933 | United Kingdom . | |
| 398239 | 9/1933 | United Kingdom | 92/221 |
| 400131 | 10/1933 | United Kingdom . | |
| 408078 | 4/1934 | United Kingdom . | |
| 556444 | 10/1943 | United Kingdom . | |
| 742442 | 12/1955 | United Kingdom . | |
| 825855 | 12/1959 | United Kingdom . | |
| 833320 | 4/1960 | United Kingdom . | |
| 948352 | 1/1964 | United Kingdom . | |
| 1008180 | 10/1965 | United Kingdom . | |
| 1007875 | 10/1965 | United Kingdom . | |
| 1025726 | 4/1966 | United Kingdom . | |
| 1292807 | 10/1972 | United Kingdom | 92/222 |
| 1467319 | 3/1977 | United Kingdom . | |
| 1593245 | 7/1981 | United Kingdom | 92/222 |
| 2115519 | 9/1983 | United Kingdom . | |

*Primary Examiner*—Gerald A. Michalsky
*Attorney, Agent, or Firm*—Leydig, Voit & Mayer

[57] ABSTRACT

The height of a piston for an internal combustion engine is reduced by the provision of gudgeon pin bores which intersect or at least partly intersect a ring band extending around the crown. This allows the mass of the piston to be reduced and allows improved visibility from the vehicle owing to reduced bonnet height. The weight of the piston is reduced so improving its performance and the performance of the engine.

4 Claims, 3 Drawing Figures

PISTONS

BACKGROUND OF THE INVENTION

1. Field of the Invention

The invention relates to pistons for internal combustion engines.

2. Review of the Prior Art

A conventional piston is provided with a crown, a ring band extending around the crown and including two or more piston ring grooves, a skirt depending from the ring band and a pair of co-axial gudgeon pin bores which intersect the skirt and receive a gudgeon pin by which the piston is attached to an associated connecting rod. The lower edge of the skirt defines the lower edge of the piston. In use, the piston reciprocates in an associated cylinder or liner formed in an engine block and, for a given stroke of the piston, the height of the block, and consequently the mass of the block is determined at least in part by the axial length of the piston from the crown to the lower edge; the shorter the axial length, the lower the height of the block.

SUMMARY OF THE INVENTION

According to the invention, there is provided a piston for an internal combustion engine, comprising a crown surrounded by a ring band including two or more axially spaced piston ring grooves and a pair of co-axial bores for receiving a gudgeon pin, the gudgeon pin bores at least partly intersecting the ring band.

According to a second aspect of the invention, there is provided a piston for an internal combustion engine and including separately formed upper and lower parts, the upper part defining a crown, at least part of a ring band and two gudgeon pin bores whose radially outer ends terminate radially inwardly of the ring band and the lower part defining a downward continuation of the at least a part of the ring band and covering the outer ends of the gudgeon pin bores.

According to a third aspect of the invention, there is provided a piston for an internal combustion engine comprising a crown surrounded by a ring band including two or more axially spaced piston ring grooves and a pair of co-axial bores for receiving a gudgeon pin, the gudgeon pin bores being spaced equidistantly or substantially equidistantly from the crown and a lower edge of the piston.

BRIEF DESCRIPTION OF THE DRAWINGS

The following is a more detailed description of an embodiment of the invention, by way of example, reference being made to the accompanying drawings in which.

DESCRIPTION OF THE PREFERRED EMBODIMENTS

The piston is formed in two parts; and upper part 40 and a lower part 41. These may be forged or cast, particularly squeeze cast, from aluminum or aluminum alloys. The material may be the same for both parts or different. Alternatively, the upper part can be made from a suitable metallic material and the lower part from a suitable plastics material.

Figure 2:
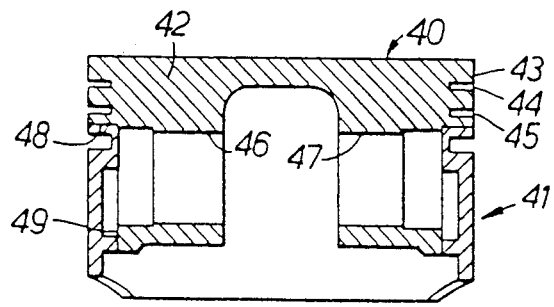
FIG. 2 is a section on the line I—I of FIG. 1.
Figure 1:
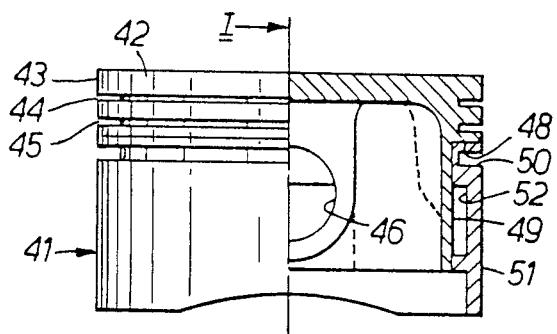
FIG. 1 is a side elevation, partly in section, of a piston for an internal combustion engine, the piston being formed in two parts.

The upper part 40 defines a crown 42 and the upper portion of a ring band 43 which includes two piston ring grooves 44, 45 extending around the ring band 43. The upper part 40 also defines two gudgeon pin bores 46, 47 whose radially outer ends terminate inwardly of the ring band 43 (see FIG. 2). At the lower edge of the ring band 43, there is an inwardly directed step 48 leading to a generally cylindrical surface 59 extending around the gudgeon pin bores 46, 47 (see FIGS. 1 and 3).

The lower part 41 is formed as a sleeve and includes, at the upper end thereof, a piston ring groove 50. The outer surface 51 of the sleeve 41 forms a skirt for the piston. The inner surface of the sleeve is formed with an annular cavity 52 which forms a heat barrier.

Figure 3:
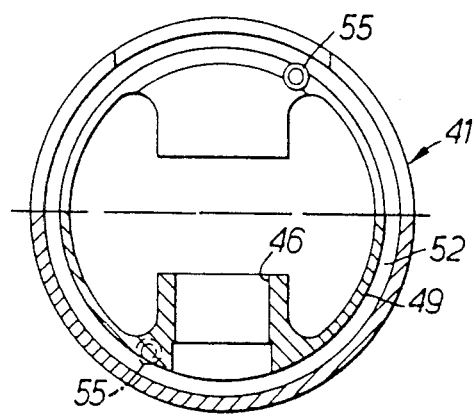
FIG. 3 is an underneath plan view of the piston of FIGS. 1 and 2, the lower half of this view being in section.

The sleeve 41 is a sliding fit over the generally cylindrical surface 49 of the upper part 40, so that the top of the sleeve sits in the step 48 and the outer surface of the ring band 43 is contiguous with the outer surface 51 of the sleeve. The sleeve 41 is connected to the upper part 40 in any convenient way, for example by welding, particularly by friction welding, or by gluing or by shrinking, or by screwing or by the use of releasable mechanical locking means. An example of the latter is a tab washer or screws 55 as seen in FIG. 3.

It will be seen that the sleeve 41 covers the open ends of the gudgeon pin bores 46, 47 and that an imaginary extension of the gudgeon pin bores partially intersects the lower part of the ring band and the piston ring groove 50 formed on the sleeve. It will be appreciated, however, that the sleeve 41 need not be formed in one piece, it could be formed in two or more pieces.

Where the sleeve is in one piece, the gudgeon pin (not shown) must be pressed through the gudgeon pin bores and the little end of the connecting rod before the sleeve 41 is fitted over the upper part 40 of the piston.

It will be seen that in the piston described above with reference to the drawings, the gudgeon pin bores are very close to the crown end of the piston. This means that the overall axial length of the piston from the crown to the lower edge can be decreased. For example, the axial length of the piston may be 50% to 70% of the diameter of the piston.

This has the advantage that the compression height (i.e. the distance between the axes of the gudgeon pin bores and the top of the crown of the piston is minimised, which is a desirable object is piston design.

This has the benefit that, for a given stroke of engine, the height of the engine can be decreased. This will give a smaller engine which decreases the weight of the vehicle and also lowers the bonnet line of the vehicle. This can also styling improvements to be made and will also increase the drivers forward visibility from the interior of the vehicle. Further, the piston is short and light which decreases its inertia and increases its acceleration so improving the performance of the engine.

A further advantage is that the piston allow a gudgeon pin to be used which is of relatively large diameter without increasing the compression height of the piston.

It will also be seen that the gudgeon pin bore is arranged substantially equidistantly between the crown and the lower edge of the piston in the embodiment described above with reference to the drawings. This means that the piston is, in use, better balanced, and requires less barrelling of the associated cylinder or liner.

A particular benefit of the piston is that it allows the gudgeon pin bores to be moved well up into the ring band region without affecting the support given to the piston rings by the piston ring grooves. As will be seen, there is support for the lowermost piston ring around the whole circumference of the piston. The presence of the gap between the upper and lower parts 40, 41 means that the lower part will be cool.

I claim:

1. A piston for an internal combustion engine, comprising:

a separately formed upper piston part, a crown provided on said upper piston part, an upper portion of a ring band provided on said upper piston part, at least two axially spaced piston ring grooves formed in said upper portion of the ring band, means defining a pair of co-axial bores for receiving a gudgeon pin provided on said upper piston part, a separately formed sleeve-shaped lower piston part connected to said upper piston part, a lower portion of said ring band provided on said lower piston part as a continuation of said upper portion of the ring band, at least one further piston ring groove formed in said lower portion of the ring band at an upper end of said lower portion and spaced axially from a lowermost part of said at least two piston ring grooves by substantially the same axial distance as the spacing of said at least two axially spaced piston ring grooves, a skirt provided on said lower piston part, said means defining said pairs of co-axial bores terminating inwardly of said second piston part so that the ends of said means defining said pair of gudgeon pin bores are covered by said sleeve-shaped lower piston part and imaginary extensions thereof at least partially intersecting the ring band to reduce the overall height of the piston.

2. A piston according to claim 1, wherein the lower piston part is connected to the upper piston part by fixing means selected from the group of welding, gluing, shrink fitting, screwing, releasable mechanical locking means.

3. A piston according to claim 1, wherein the lower piston part is made from a different material from the material of the upper piston part.

4. A piston according to claim 1, wherein the gudgeon pin bores are spaced equidistantly from the crown and a lower edge of the piston.

* * * * *